(12) United States Patent
Carroll

(10) Patent No.: US 8,740,022 B2
(45) Date of Patent: Jun. 3, 2014

(54) VOLUMETRIC METERING DEVICE

(75) Inventor: Ryan S. Carroll, Blaine, MN (US)

(73) Assignee: Ecolab USA Inc., St. Paul, MN (US)

( * ) Notice: Subject to any disclaimer, the term of this patent is extended or adjusted under 35 U.S.C. 154(b) by 3 days.

(21) Appl. No.: 13/397,369

(22) Filed: Feb. 15, 2012

(65) Prior Publication Data

US 2013/0206281 A1 Aug. 15, 2013

(51) Int. Cl.
*G01F 11/00* (2006.01)

(52) U.S. Cl.
USPC ........ 222/335; 222/133; 222/282; 222/145.5; 222/630

(58) Field of Classification Search
USPC .............. 222/133, 134, 145.5, 207, 204, 205, 222/430, 434, 256, 386, 387, 282, 40, 5, 222/436, 444, 55, 552, 71, 630, 637, 335; 137/39; 422/501, 525; 604/38, 296, 604/298; 73/864.11, 864.12
See application file for complete search history.

(56) References Cited

U.S. PATENT DOCUMENTS

| | | | |
|---|---|---|---|
| 2,443,981 A * | 6/1948 | Funk et al. | 222/259 |
| 2,599,379 A * | 6/1952 | Gabler | 222/327 |
| 3,986,645 A * | 10/1976 | Baldwin et al. | 222/386 |
| 4,121,584 A | 10/1978 | Turner et al. | |
| 4,223,808 A * | 9/1980 | Williams et al. | 222/88 |
| 4,457,755 A * | 7/1984 | Wilson | 604/184 |
| 4,469,137 A | 9/1984 | Cleland | |
| 4,598,840 A | 7/1986 | Burg | |
| 4,702,393 A | 10/1987 | Chen | |
| 5,324,266 A * | 6/1994 | Ambrisco et al. | 604/125 |
| 5,755,361 A * | 5/1998 | Restive et al. | 222/209 |
| 5,992,705 A * | 11/1999 | Lhuisset | 222/386 |
| 5,997,518 A | 12/1999 | Laibovitz et al. | |
| 6,382,472 B1 * | 5/2002 | Shoval | 222/387 |
| 6,945,435 B2 * | 9/2005 | Salamini | 222/386 |
| 7,527,064 B2 * | 5/2009 | Kito et al. | 137/39 |
| 2003/0207464 A1 | 11/2003 | Lemmo et al. | |
| 2006/0079831 A1 | 4/2006 | Gilbert | |
| 2007/0055249 A1 * | 3/2007 | Jensen et al. | 606/69 |
| 2008/0300533 A1 * | 12/2008 | Lumpkin et al. | 604/35 |
| 2009/0065065 A1 | 3/2009 | Sand | |

FOREIGN PATENT DOCUMENTS

EP 913356 B1 8/2006
WO 2009004324 A1 1/2009

* cited by examiner

*Primary Examiner* — Frederick C Nicolas
*Assistant Examiner* — Bob Zadeh
(74) *Attorney, Agent, or Firm* — Shumaker & Sieffert, P.A.

(57) ABSTRACT

A metering device meters and dispenses of a known volume of a liquid product. The metering device includes a receptacle and a moveable slug sized to fit within the receptacle, leaving a remaining volume within the receptacle equivalent to a desired amount of a liquid product to be dispensed. Application of a vacuum at the outlet end draws the known volume of liquid product out of the receptacle and causes the moveable slug to move from a first position at the inlet end of the receptacle to a second position at the outlet end of the receptacle. At the same time, additional liquid product is drawn in via the inlet aperture. When the vacuum is removed, the slug returns through the additionally drawn-in liquid product back to the first position.

18 Claims, 6 Drawing Sheets

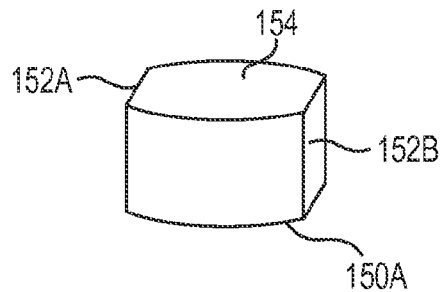 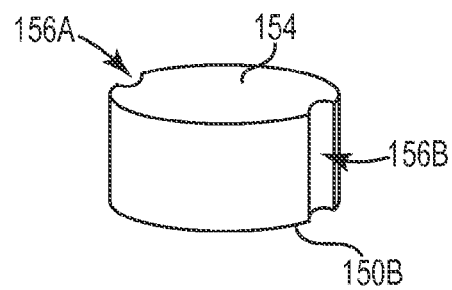
Fig. 3A    Fig. 3B
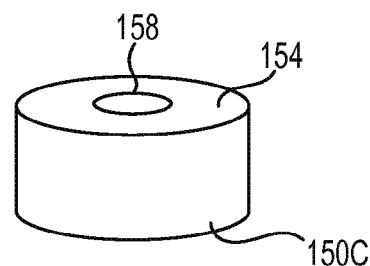
Fig. 3C
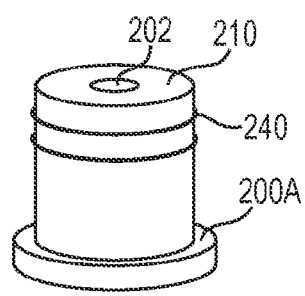 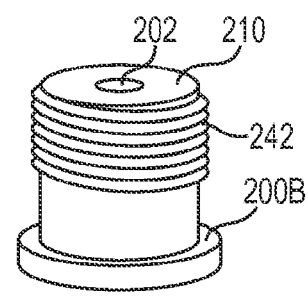
Fig. 4A    Fig. 4B

US 8,740,022 B2

VOLUMETRIC METERING DEVICE

TECHNICAL FIELD

This disclosure relates to mechanisms for dispensing a liquid product.

BACKGROUND

Chemical products are often packaged in a concentrated form that, depending upon the application, may be diluted with water to create a use solution having a desired concentration. These concentrates or ultra concentrates may permit more efficient transport and storage over their less concentrated counterparts. Such concentrated chemical products may include, for example, detergents and other cleaning or sanitizing products. The concentration of the chemical product in the use solution is often important to ensure effective cleaning. In addition, there are many applications where the concentration of the use solution is regulated to ensure effective sanitizing or disinfecting.

SUMMARY

In general, this disclosure relates to metering and dispensing controlled quantities of a liquid product. The liquid product may include, for example, a liquid chemical product, a concentrated liquid chemical product, or an ultra concentrated liquid chemical product.

In one example, the disclosure is directed to an apparatus comprising a substantially cylindrical receptacle defining a cavity and including an inlet end having an inlet aperture and an outlet end having an outlet aperture, and a slug sized to fit within the cavity in a first position at the inlet end of the receptacle and sized to create a known volume within the cavity equivalent to a desired amount of a liquid product to be dispensed, the slug further sized to move within the cavity from the first position to a second position at the outlet end of the receptacle upon application of a vacuum to the outlet aperture and dispensation of the known volume of liquid product from the cavity via the outlet aperture.

In another example, the disclosure is directed to a system for metering and dispensing a liquid product, comprising a metering device comprising a substantially cylindrical receptacle defining a cavity and including an inlet end having an inlet aperture and an outlet end having an outlet aperture, and a slug sized to fit within the cavity in a first position at the inlet end of the receptacle and sized to create a known volume within the cavity equivalent to a desired amount of a liquid product to be dispensed, the slug further sized to move within the cavity from the first position to a second position at the outlet end of the receptacle upon application of a vacuum to the outlet aperture and dispensation of the known volume of liquid product from the cavity via the outlet aperture, a venturi pump connected to receive liquid product through the outlet aperture and by which the vacuum at the outlet aperture is generated when water flows through the venturi pump, and a product container from which additional liquid product is drawn into the cavity via the inlet aperture as the known volume of liquid product is dispensed.

The details of one or more examples are set forth in the accompanying drawings and the description below. Other features and advantages will be apparent from the description and drawings, and from the claims.

BRIEF DESCRIPTION OF DRAWINGS

FIGS. 3A-3C are schematic diagrams illustrating example plugs for a volumetric metering device.

FIGS. 4A and 4B are schematic diagrams illustrating example volume adjustment fittings for a volumetric metering device.

DETAILED DESCRIPTION

Figure 1A:
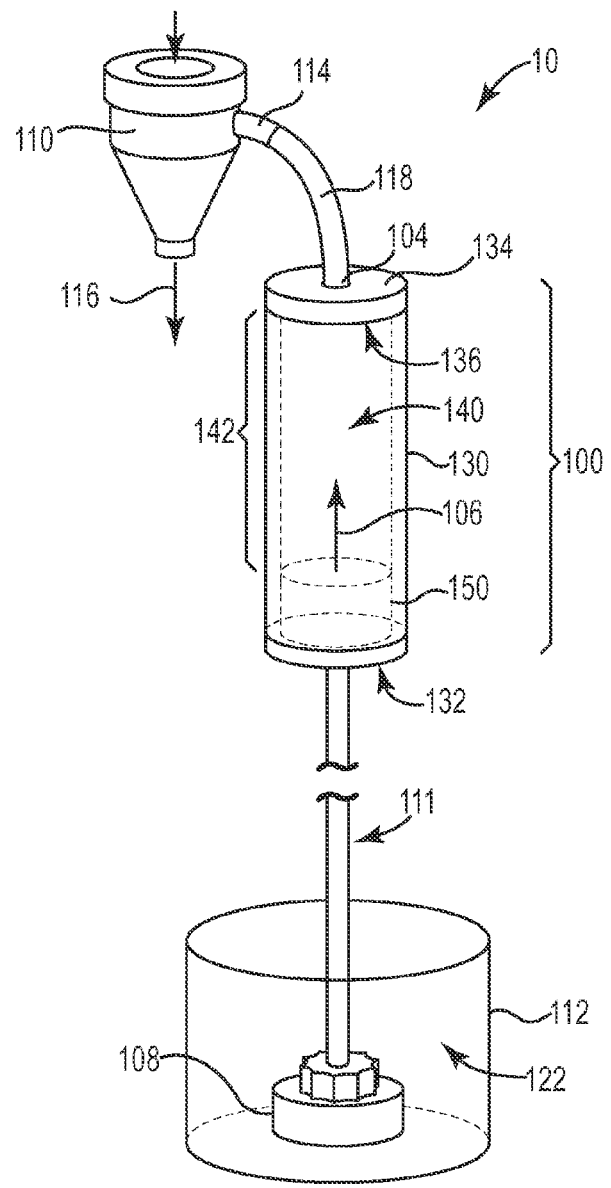
FIGS. 1A and 1B are schematic diagrams illustrating an example volumetric metering device connected to a venture pump.

FIG. 1A is a schematic diagram illustrating an example volumetric metering system 10. System 10 includes a venturi pump 110, a product container 112 holding a supply of liquid product, and a metering device 100. In general, metering device 100 allows a fixed amount (i.e., volume) of a liquid product to be delivered from product container 112 to pump 110. Once the fixed volume of product is delivered, metering device 100 prevents any further product flow until the pump is turned off and metering device 100 is reset.

In this example, metering device 100 includes a generally cylindrical or tube-shaped receptacle 130 having an inlet end 132 and an outlet end 134. An inlet aperture 102 (see FIG. 1B) at inlet end 132 permits liquid product to be drawn into metering device 10 from product container 112 via a first product pick-up line 111. An outlet aperture 104 in outlet end 134 permits liquid product to be delivered from receptacle 130 to pump 110 via a second product pick-up line 118.

A slug 150 is sized to move within a cavity defined by receptacle 130. For example, the slug may slide from a first position at inlet end 132 of metering device 100, such as that shown in FIG. 1A, to a second position against a sealing surface 136 on an interior side of outlet end 134, such as that shown in FIG. 1B.

Slug 150 is sized such that an available volume within the receptacle (when the slug is in the cavity) is equivalent to a desired volume of liquid product to be dispensed. For example, in FIG. 1A, slug 150 is located in a first position at the inlet end 132 of receptacle 130 and an available volume, indicated by reference numeral 142, may be filled with an equivalent volume of liquid product 140. Similarly, in FIG. 1B, slug 150 is located in the second position at the outlet end 134 of receptacle 130 and an available volume, indicated by reference numeral 146, may be filled with an equivalent volume of liquid product 144. Volumes 142 and 146 are substantially equivalent.

When water flows through venturi pump 110 as indicated by the direction of arrows 116, a vacuum is generated at product pick-up barb 114. This evacuates the volume of liquid product 140 out of metering device 100 via second product pickup line 118 and into the venturi pump 110 where it is mixed with the water flow. Delivery of the liquid product 140 out of the outlet aperture along with continued presence of the vacuum cause slug 150 to move within receptacle 130 toward the outlet end 134. Contact of the top end of slug 150 against sealing surface 136 on an interior side of outlet end 134 blocks further product flow to the venturi pump. Sealing surface 136 may include a gasket, an o-ring, a coating, or other mechanical seal configured provide a seal between slug 150 and a outlet end sealing surface. In these examples, the outlet end sealing surface 136 is shown and described as being located at the interior side of outlet end cap 134. However, the outlet end sealing surface 136 may be positioned elsewhere within the metering device, and the disclosure is not limited in this respect. For example, a separate sealing surface that is not necessarily a part of or attached to the outlet end cap 134 could be placed between the slug and the outlet end cap 134.

Venturi pump 110 may include any type of pump, injector, ejector, eductor aspirator, inductive pump, or other mechanism for applying sufficient suction to draw the fluid product out of receptacle 130, draw slug 150 toward the outlet end 134 of metering device 100 and hold slug 150 against sealing surface 136 while the vacuum is applied.

As the set volume of product is delivered and slug 150 moves up toward the outlet end 134 of receptacle 130, the resulting partial vacuum (e.g., there is relatively less pressure at outlet aperture 104 than at inlet aperture 102) draws additional product up from product container 112 into the receptacle. When slug 150 reaches the sealing surface 136, the set volume of product 144 has been drawn up into the receptacle 100 behind plug 150. When slug 150 contacts sealing surface 136, further delivery of liquid product to the venturi pump is blocked regardless of the vacuum generated by the venturi pump.

Once water stops flowing through the venturi pump, the partial vacuum applied at outlet aperture 104 is removed. Slug 150 may be designed such that, when the partial vacuum is eliminated, slug 150 moves back through the product 144 until it rests again in the first position against the inlet end 132 of receptacle 130 as shown in FIG. 1A. For example, slug 150 may be designed such that it permits liquid product to flow around the sides of the slug, through apertures in the slug, or other appropriate slug design. Alternatively, one or more grooves may be formed on the interior sides of receptacle 130 that permit fluid to flow around the slug 150 as it moves back to the inlet end 132 of receptacle 130. Other alternatives, such as a duck valve or an umbrella valve fitted within a donut-shaped slug are described herein below with respect to FIGS. 6A and 6B.

In this way, the slug reduces or eliminates product flow in excess of the known volume while a vacuum is applied, and permits a known volume of the liquid product to flow into the metering device when the vacuum is released.

Movement of the slug from the second position at outlet end 134 to the first position at inlet end 132 of receptacle 130 may be achieved in any of a number of ways. For example, slug 150 may be designed to have a density that is relatively greater than the density of the liquid product. In that example, gravity may return the slug to the bottom of receptacle 100. As another example, a spring may be installed between sealing surface 136 and slug 150, such that a spring force may be used to return the slug to the inlet end of receptacle 130 (see, e.g., FIG. 5). As another example, magnetic force, or other force may be used to return the slug to the bottom of receptacle 100.

Figure 1B:
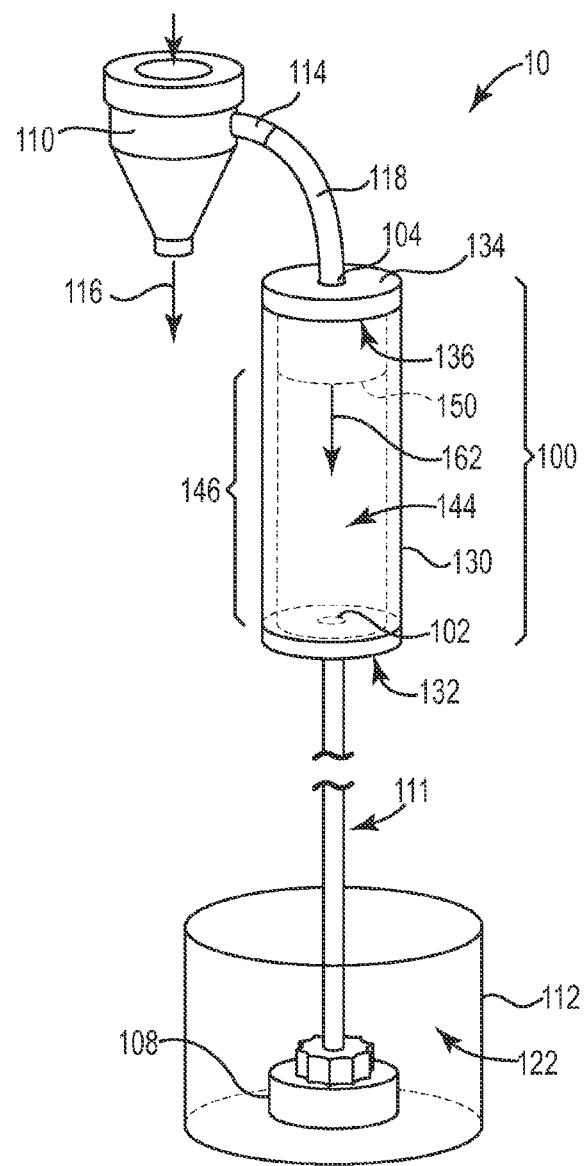

A foot valve, check valve or other type of one-way valve 108 may be installed in the line between metering device 100 and product container 112. Check valve 108 may help ensure that the system remains primed and that the liquid product does not flow back into the container leaving the pickup tubes and metering device 100 empty of product. Valve 108 may be located in product supply 112, as shown in FIGS. 1A and 1B, for example, or in another appropriate location. When suction from aperture 104 is released, valve 108 may prevent backflow of liquid product from receptacle 100 into product supply container 112.

Figure 2:
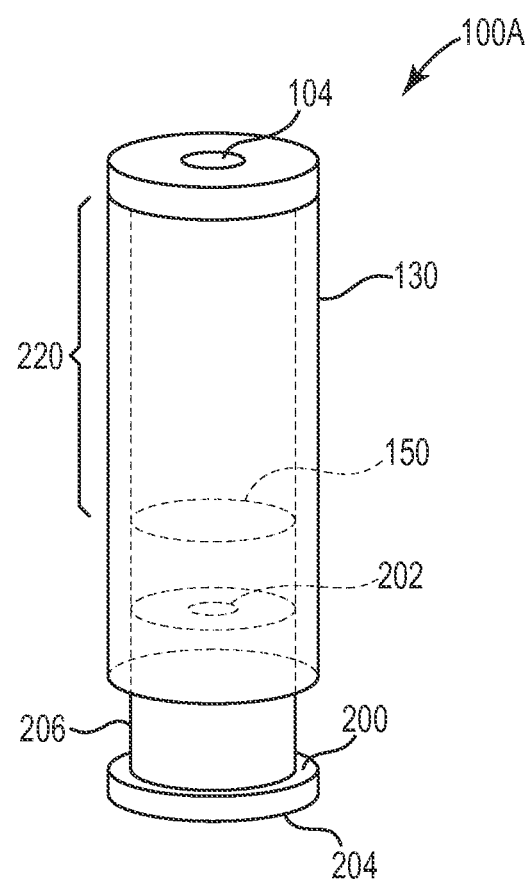
FIG. 2 is a schematic diagram illustrating an example volumetric metering device.

The volume of metering device 100 may be adjustable. For example, an adjustable fitting may be installed at one or both ends, 132 and/or 134, of metering device 100. FIG. 2 is a schematic diagram of another example metering device 100A having a volume adjustment fitting 200 at the inlet end 132 of receptacle 130. In this example, fitting 200 includes a first section 206 sized to fit within the interior walls of receptacle 130 and a second section 204 having a diameter relatively larger than an inner diameter of the receptacle 130. Volume adjustment fitting 200 is sized to slide within the receptacle 130 and thus adjust the available volume (indicated by reference numeral 220) within receptacle 130. Fitting 200 may be sized to use a friction fit between the sides of fitting 200 and the walls of receptacle 100 to prevent fitting 200 from shifting or leaking when suction is applied to receptacle 100 via aperture 104. Fitting 200 may be sealed using, for example, a sliding o-ring or other sealing mechanism. Volume adjustment fitting 200 may contain an aperture 202 that allows liquid product to enter metering device 100.

FIGS. 3A-3C are schematic diagrams illustrating example slugs 150A, 150B and 150C for a volumetric metering device 100. It shall be understood that slugs 150A-150C are presented for example purposes only, and that the disclosure is not limited in this respect. In general, slug 150 is designed to include one or more product bypass features that permits flow of liquid product from one side of the slug to the other side of the slug as the slug returns to the first, starting position at the inlet end of metering device 100.

Slugs 150A and 150B, for example, illustrate two examples of product bypass side walls. Slug 150A, for example, is substantially cylindrical and includes sheared-off product bypass side walls 152A and 152B. When slug 150A is positioned within a receptacle, such as receptacle 130, sheared-off product bypass side walls 152A and 152B and the interior walls of receptacle 130 form corresponding product bypass passages through which liquid product may flow from one side of the slug to the other side of the slug. As another example, slug 150B includes one or more notched product bypass sidewalls, such as notched sidewalls 156A and 156B. When slug 150B is positioned within a receptacle, such as receptacle 130, notched side walls 156A and 156B and the interior walls of receptacle 130 form corresponding product bypass passages through which liquid product may flow from one side of the slug to the other side of the slug. In general, the product bypass features are designed in any way that may allow the liquid product to flow around slug 150 as it returns from outlet end 134 to inlet end 132 of metering device 100. Alternatively or in addition, one or more product bypass grooves may be formed into the sidewall of receptacle 130.

Slug 150C includes one or more product bypass apertures (in this case, a single product bypass aperture 158) extending from a top end of slug 150C to a bottom end of slug 150C. Product bypass aperture(s) 158 permits the liquid product to flow though product bypass aperture(s) 158 as slug 150C returns from outlet end 134 to inlet end 132 of metering device 100. In the example shown in FIG. 3C, a central axis of generally cylindrical product bypass aperture 158 is aligned with a central axis of generally cylindrical slug 150C. Alternatively, one or more apertures may be positioned so that they are not aligned with the central axis of slug 150. In the case of non-cylindrical slugs and/or non-cylindrical product bypass apertures, the product bypass apertures may be either centered within or not centered within slug 150.

Slugs 150A, 150B, 150C or other appropriate slug design, may include a sealing face 154 that creates a seal when it comes into contact with sealing surface 136. Sealing face 154 may be coated with a rubber, polyurethane, elastomer, plastic or other sealing material to aid in forming a seal over outlet aperture 104.

FIGS. 4A and 4B are schematic diagrams illustrating example volume adjustment fittings 200A and 200B for a volumetric metering device, such as metering device 100. Fittings 200A and 200B may include an aperture 202 that allows a liquid product to enter or leave the metering device. Fittings 200A and/or 200B may include sealing mechanisms, such as O-ring(s) 240 (FIG. 4A) or screw-type threads 242 (FIG. 4B), that provide a press fit against the interior sidewalls of receptacle 130. The sealing mechanisms may help to prevent leakage around or slippage of fittings 200A and/or 200B within receptacle 130. One or more fittings, such as fittings 200, 200A, or 200B may be located at inlet end 132 and/or outlet end 134 of receptacle 130. A face 210 of plug 200 may serve as a mounting point for a spring, magnet, or other device that returns sliding slug 106 to the inlet end 132 of metering device 100.

Figure 5:
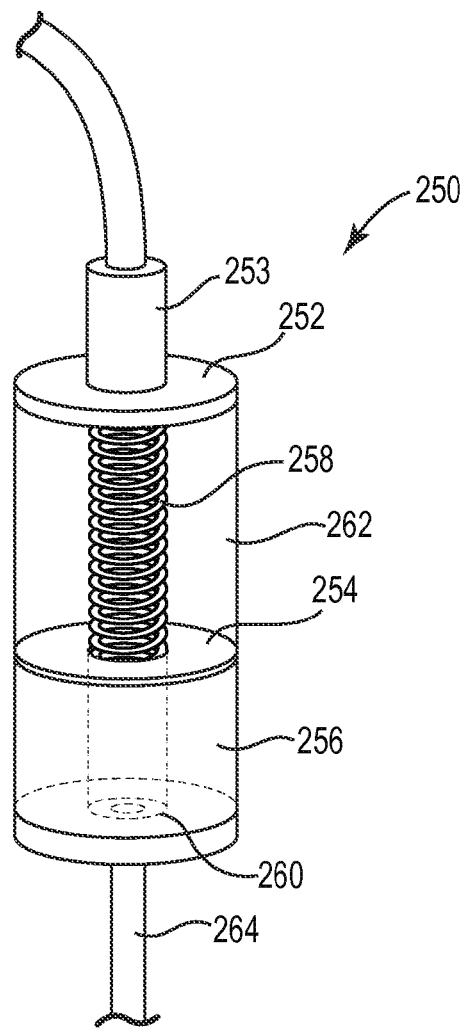
FIG. 5 is a schematic diagram of another example volumetric metering device including a compression spring configured to return a slug from an outlet end to an inlet end of a receptacle.

FIG. 5 is a schematic diagram of another example metering device 250 having a compression spring 258 configured to return a donut-shaped slug 256 from the outlet end to the inlet end of receptacle 130 upon release of the vacuum. A first end of spring 258 is connected to or positioned within an aperture 260 of donut-shaped slug 256 and a second end of spring 258 is connected or positioned within an outlet end cap 253. In this example, an umbrella valve 254 is fitted within aperture 260 of slug 256. An outlet end cap 252 includes a spring compression space 253 configured to receive the compressed spring as the slug is drawn up to the outlet end of receptacle 262.

In use, when a vacuum is applied at product pick-up line, slug 256 is drawn from the inlet end of receptacle 262 toward the outlet end of receptacle 262. At the same time, additional liquid product is drawn into receptacle 262 through product pick-up line 264. As slug 256 is drawn toward the outlet end, spring 258 is compressed until the slug has been drawn against outlet end. Umbrella valve 254 forms a sealing surface between the top end of slug 256 and the interior side of outlet end cap 252. When the vacuum is released, energy stored in the compressed spring causes the slug to move back through the fluid in receptacle and toward the inlet end of receptacle 262.

In general the spring rate (the change in load per unit deflection, measured in, for example, pounds per inch or Newtons per millimeter) may be chosen such that the spring is light enough to permit the slug to be drawn from the inlet to the outlet end of the receptacle upon application of a vacuum and also strong enough to return the slug from the outlet end to the inlet end upon release of the vacuum. As shown in FIG. 5, the spring may be an open-coil helical compression spring (straight, conical, concave, convex, etc.) that is fitted within an aperture of a donut-shaped slug and/or within an aperture of an outlet end cap. However, other types of compression springs may also be used, and the disclosure is not limited in this respect.

Figure 6A:
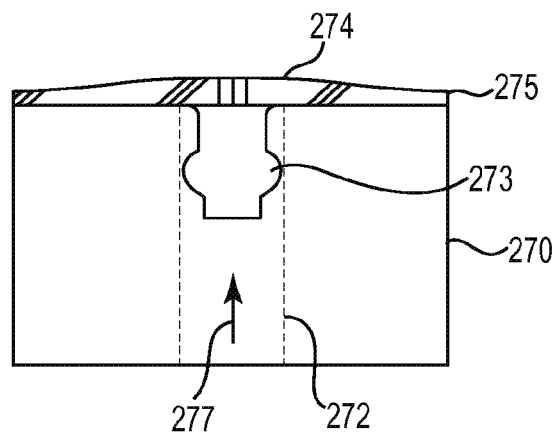
FIG. 6A is a cross-sectional side view of an example umbrella valve positioned within an aperture of a donut-shaped slug.
Figure 6B:
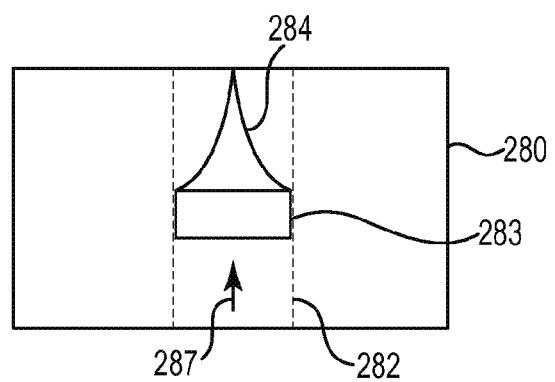
FIG. 6B is a cross-sectional side view of an example duckbill valve positioned within an aperture of a donut-shaped slug.

FIG. 6A is a cross-sectional side view of an example umbrella valve 274 positioned within an aperture 272 of a donut-shaped slug 270. FIG. 6B is a cross-sectional side view of an example duckbill valve 284 positioned within an aperture 282 of a donut-shaped slug 280.

In FIG. 6A, umbrella valve 274 includes an elastomeric umbrella or diaphragm-shaped sealing disk 275 and a stem 273. Stem 273 is shaped to hold the umbrella valve in place within aperture 272. The vacuum rating of umbrella valve 274 may be chosen so as not to allow fluid flow through the duckbill in the direction indicated by arrow 287 when a vacuum is applied. When mounted within the aperture 272 of slug 270, umbrella valve 274 moves with slug 270 while vacuum is applied. In some examples, some liquid may bypass the slug through the umbrella valve as slug 270 moves from the inlet position to the outlet position. Once slug 270 reaches the outlet position, sealing disk 275 of umbrella valve 274 seals the outlet port preventing any further chemical product from exiting the metering device. When the vacuum is shut off, and the slug returns to the starting position at the inlet end, umbrella valve 274 prevents fluid from flowing the opposite direction that the arrow 277. However, it allows fluid to flow the same direction as arrow 277 and refill the chamber 142 of FIG. 1A.

In FIG. 6B, duckbill valve 284 includes a base 282 and a tapered, flattened duckbill portion 284. In this example, base 283 is sized to fit within aperture 282 of donut-shaped slug 280. The vacuum rating of duckbill valve 284 may be chosen so as not to allow fluid flow through the duckbill in the direction indicated by arrow 287 when a vacuum is applied. When a vacuum is applied, slug 280, along with duckbill 284, will move from the inlet position to the outlet position allowing the fluid above the slug to exit the metering device. Once the vacuum is shut off, slug 280 moves from the exit position to the inlet position. During this movement the duckbill 284 opens, allowing fluid to flow through the duckbill 284 in the direction indicated by arrow 287.

Referring again to FIGS. 1A and 1B, the sequence of events during operation of the example volumetric metering device 100 is as follows. As shown in FIG. 1A, prior to dispensation of the liquid product 140, slug 150 is located in the first position at the inlet end 132 of receptacle 130. A volume of liquid product 140 to be dispensed fills the known available volume 142 inside of receptacle 130. Suction is applied at the outlet aperture 104 of receptacle 130. In this example, water flowing through venturi pump 110 produces a partial vacuum at the outlet aperture 104 by means of the Venturi effect. Application of the partial vacuum causes the liquid product to be drawn up through the outlet aperture 104 and into product pick-up line 118. The liquid product is then delivered to the venturi pump where it is mixed with the stream of water flowing through the venturi pump as indicated by arrow 116.

As the vacuum is applied and the liquid product is dispensed, slug 150 moves from the first position at the inlet end 132 of receptacle 130 toward the outlet end 134 as indicated by arrow 160 in FIG. 1A. Once all of the liquid product 140 has been dispensed, a top end of slug 150 will contact the sealing surface 136 on the inside of outlet end 134, as shown in FIG. 1B. Contact of slug 150 with the sealing surface effectively blocks any further dispensation of liquid product regardless of the strength of the vacuum applied.

As the liquid product 140 is dispensed and slug 150 moves from the inlet end toward the outlet end of receptacle 130, a vacuum is further created at inlet aperture 102. A new supply of liquid product is thus drawn from product container 112, through product pick-up line 111 and into receptacle 130 via inlet aperture 102. Liquid product from product container 112 will continue to be drawn in to fill the volume 146 created by dispensation of liquid product 140 and movement of the slug 150 until the volume 146 is filled with liquid product or until the suction is no longer applied.

When the venturi pump is turned off and vacuum/suction is no longer applied at outlet aperture 104, the vacuum force holding slug 150 at the outlet end of receptacle 134 is eliminated. Slug 150 may then return back through the newly filled volume of liquid product 144 until it returns to its starting position as shown in FIG. 1.

Various examples have been described. These and other examples are within the scope of the following claims.

The invention claimed is:

1. An apparatus comprising:
 a substantially cylindrical receptacle defining a cavity and including an inlet end having an inlet aperture and an outlet end having an outlet aperture; and
 a slug sized to fit within the cavity in a first position at the inlet end of the receptacle and sized to create a first known volume within the cavity equivalent to a desired amount of a liquid product to be dispensed, the slug further sized to move within the cavity from the first position to a second position at the outlet end of the receptacle upon application of a vacuum to the outlet aperture,
 wherein a second known volume of the liquid product substantially equivalent to the first known volume of the liquid product is drawn into the cavity via the inlet aperture as the first known volume of the liquid product is dispensed and the slug moves toward the outlet end of the receptacle;
 the slug further including at least one product bypass sized to permit the second known volume of the liquid product to flow toward the outlet end of the receptacle such that the slug moves from the second position through the second known volume of the liquid product and returns to the first position at the inlet end of the receptacle when application of the vacuum to the outlet aperture is removed.

2. The apparatus of claim 1 wherein the slug further includes a top surface that blocks the outlet aperture when the slug is in the second position at the outlet end of the receptacle and prevents further dispensation of the liquid product.

3. The apparatus of claim 1 wherein the at least one product bypass includes one or more product bypass sidewalls sized to permit the liquid product to flow around the slug as the slug moves from the second position through the second known volume of the liquid product and returns to the first position at the inlet end of the receptacle when application of the vacuum to the outlet aperture is removed.

4. The apparatus of claim 3 wherein the one or more product bypass sidewalls include a notched sidewall.

5. The apparatus of claim 3 wherein the one or more product bypass sidewalls include a sheared-off sidewall.

6. The apparatus of claim 1, wherein the at least one product bypass includes a product bypass aperture extending from a top end of the slug to a bottom end of the slug, and wherein the apparatus further comprises an umbrella valve configured to fit within the product bypass aperture and permit the liquid product to flow through the product bypass aperture during movement of the slug from the second position to the first position and prevent the liquid product from flowing through the product bypass aperture when the vacuum is applied.

7. The apparatus of claim 1, wherein the at least one product bypass includes a product bypass aperture extending from a top end of the slug to a bottom end of the slug, and wherein the apparatus further comprises a duckbill valve configured to fit within the product bypass aperture and permit the liquid product to flow through the product bypass aperture during movement of the slug from the second position to the first position and prevent the liquid product from flowing through the product bypass aperture when the vacuum is applied.

8. The apparatus of claim 1 further including:
 a product container from which the liquid product is drawn into the receptacle via a first product pick-up line at the inlet end of the receptacle; and
 a venturi pump connected to receive the first known volume of the liquid product from the receptacle via a second product pick-up line at the outlet end of the receptacle.

9. The apparatus of claim 6 wherein flow of water through the venturi pump generates the vacuum at the outlet aperture.

10. The apparatus of claim 1 further comprising a volume adjustment fitting sized to fit within the inlet end of the receptacle.

11. The apparatus of claim 1 wherein an interior side of the outlet end includes a sealing surface.

12. The apparatus of claim 1 wherein the slug has a density relatively greater than a density of the liquid product.

13. The apparatus of claim 1 wherein the slug includes an aperture, and wherein the apparatus further comprises a compression spring having a first end positioned within the aperture and a second end positioned within an outlet end cap.

14. The apparatus of claim 13 wherein the spring returns the slug toward the inlet end when application of the vacuum to the outlet aperture is removed.

15. A system for metering and dispensing a liquid product, comprising:
 a metering device comprising:
  a substantially cylindrical receptacle defining a cavity and including an inlet end having an inlet aperture and an outlet end having an outlet aperture; and
  a slug sized to fit within the cavity in a first position at the inlet end of the receptacle and sized to create a first known volume within the cavity equivalent to a desired amount of a liquid product to be dispensed, the slug further sized to move within the cavity from the first position to a second position at the outlet end of the receptacle upon application of a vacuum to the outlet aperture and dispensation of the first known volume of the liquid product from the cavity via the outlet aperture,
  wherein a second known volume of the liquid product substantially equivalent to the first known volume of the liquid product is drawn into the cavity via the inlet aperture as the first known volume of the liquid product is dispensed and the slug moves toward the outlet end of the receptacle;
  the slug further including at least one product bypass sized to permit the second known volume of the liquid product to flow toward the outlet end of the receptacle such that the slug moves from the second position through the second known volume of the liquid product and returns to the first position at the inlet end of the receptacle when application of the vacuum to the outlet aperture is removed;
 a venturi pump connected to receive the liquid product through the outlet aperture and by which the vacuum at the outlet aperture is generated when water flows through the venturi pump; and
 a product container from which additional liquid product is drawn into the cavity via the inlet aperture as the first known volume of liquid product is dispensed.

16. The system of claim 15 wherein the slug further includes a top surface that blocks the outlet aperture when the slug is in the second position at the outlet end of the receptacle and prevents further dispensation of the liquid product.

17. The system of claim 15, wherein the product bypass includes a product bypass aperture extending from a top end of the slug to a bottom end of the slug, and wherein the apparatus further comprises an umbrella valve configured to fit within the product bypass aperture and permit the liquid product to flow through the product bypass aperture during movement of the slug from the second position to the first position and prevent the liquid product from flowing through the product bypass aperture when the vacuum is applied.

18. The system of claim 15, wherein the product bypass includes a product bypass aperture extending from a top end of the slug to a bottom end of the slug, and wherein the apparatus further comprises a duckbill valve configured to fit within the product bypass aperture and permit the liquid product to flow through the product bypass aperture during movement of the slug from the second position to the first position and prevent the liquid product from flowing through the product bypass aperture when the vacuum is applied.

* * * * *